United States Patent
Sarno et al.

(10) Patent No.: US 9,849,993 B2
(45) Date of Patent: Dec. 26, 2017

(54) FIRST EQUIPMENT HEATING DEVICE

(71) Applicant: THALES, Courbevoie (FR)

(72) Inventors: Claude Sarno, Valence (FR); Romain Hodot, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/220,428

(22) Filed: Jul. 27, 2016

(65) Prior Publication Data
US 2017/0029121 A1    Feb. 2, 2017

(30) Foreign Application Priority Data
Jul. 28, 2015    (FR) ...................................... 15 01617

(51) Int. Cl.
| | | |
|---|---|---|
| G01F 1/68 | (2006.01) |
| B64D 15/06 | (2006.01) |
| B64D 15/12 | (2006.01) |
| B64D 43/02 | (2006.01) |
| F28D 15/02 | (2006.01) |

(Continued)

(52) U.S. Cl.
CPC .............. B64D 15/06 (2013.01); B33Y 10/00 (2014.12); B33Y 50/02 (2014.12); B33Y 80/00 (2014.12); B64D 15/12 (2013.01); B64D 43/02 (2013.01); B64F 5/10 (2017.01); F28D 15/02 (2013.01); F28D 15/0266 (2013.01); G01P 5/165 (2013.01); B64D 33/08 (2013.01); *F28D 2021/0021* (2013.01)

(58) Field of Classification Search
CPC .................................. B64D 15/06; G01F 1/46
See application file for complete search history.

(56) References Cited

U.S. PATENT DOCUMENTS

| | | | | |
|---|---|---|---|---|
| 4,275,603 A | * | 6/1981 | Kalocsay ................ | G01P 5/165 165/104.26 |
| 5,025,661 A | * | 6/1991 | McCormack ....... | G01L 19/0007 73/180 |

(Continued)

FOREIGN PATENT DOCUMENTS

| CN | 101590913 A | 12/2009 |
|---|---|---|
| EP | 1 524 190 A2 | 4/2005 |

(Continued)

OTHER PUBLICATIONS

French Search Report, dated Mar. 23, 2016, from corresponding French application.

*Primary Examiner* — Jewel V Thompson
(74) *Attorney, Agent, or Firm* — Young & Thompson

(57) ABSTRACT

An aircraft provided with at least two pieces of aeronautic equipment, a first piece of equipment (25) including a part intended to be arranged at a skin (27) of the aircraft and elements for heating the part, characterized in that the heating elements include a thermodynamic loop including a closed circuit in which a heat transfer fluid circulates, the closed circuit including an evaporator (14) associated with functional elements (80) of the second piece of equipment (81) of the aircraft forming a heat source giving off heat during their operation and a zone in which a condensation of the heat transfer fluid can occur in the appendage to heat it, and in that outside the evaporator (14), the circuit in which the fluid circulates is formed by a tubular channel with an empty section.

14 Claims, 5 Drawing Sheets

(51) Int. Cl.
*G01P 5/165* (2006.01)
*B33Y 10/00* (2015.01)
*B64F 5/10* (2017.01)
*B33Y 80/00* (2015.01)
*B33Y 50/02* (2015.01)
B64D 33/08 (2006.01)
F28D 21/00 (2006.01)

(56) References Cited

U.S. PATENT DOCUMENTS

| | | | | |
|---|---|---|---|---|
| 6,568,260 | B2* | 5/2003 | Hakenesch | G01L 5/16 73/170.02 |
| 6,817,240 | B2* | 11/2004 | Collot | G01K 13/02 374/E13.006 |
| 7,124,630 | B2* | 10/2006 | Hanson | B64D 15/12 374/E13.006 |
| 7,716,980 | B1 | 5/2010 | Colten et al. | |
| 2010/0084118 | A1 | 4/2010 | Murer et al. | |
| 2015/0068703 | A1 | 3/2015 | De Bock et al. | |

FOREIGN PATENT DOCUMENTS

| | | |
|---|---|---|
| EP | 2 700 952 A1 | 2/2014 |
| FR | 2 833 347 A1 | 6/2003 |
| GB | 2 389 174 A | 12/2003 |
| WO | 2005/063566 A2 | 7/2005 |

\* cited by examiner

FIRST EQUIPMENT HEATING DEVICE

The invention relates to an aircraft, and more particularly to the heating of a first piece of aeronautic equipment intended to be arranged at the skin of the aircraft.

To perform its mission, an aircraft comprises several pieces of equipment comprising parts flush with or appendages protruding from the skin of the aircraft.

These appendages or these flush parts for example belong to probes in particular making it possible to measure different aerodynamic parameters of the airflow surrounding the aircraft, in particular the total pressure, static pressure, temperature, or incidence of the airflow near the skin of the aircraft.

The total pressure, combined with the static pressure, makes it possible to determine the local speed of the airflow near the probe.

Other probes for example make it possible to measure the local incidence of an airflow.

The incidence probes may comprise moving appendages intended to be oriented in the axis of the airflow surrounding the probe.

The orientation of the probe makes it possible to determine the incidence of the airflow.

Other incidence probes may be equipped with stationary appendages equipped with several pressure taps.

The pressure difference measured between these pressure taps makes it possible to determine the incidence of the airflow surrounding the probe.

Other pieces of equipment such as cameras also must be installed flush or protruding relative to the skin of the aircraft, for example on pods.

During flight at high altitudes, the aircraft may encounter freezing conditions.

More specifically, ice may form on the skin and appendages of the aircraft. The appearance of ice is particularly problematic for the aerodynamic probes, the profiles of which may be modified by ice and the pressure tap orifices of which may be obstructed.

The measuring instruments mounted on pods may also be disrupted by the appearance of ice.

One solution making it possible to avoid ice formation consists of heating the appendages.

Currently, in most cases, heating is done using electrical resistances embedded in the appendages.

The heating is done by Joule effect. For example, to heat a total pressure probe, it is necessary to dissipate several hundred watts.

More specifically, this type of probe is formed by a mast bearing a tube closed at one of its ends and called Pitot tube.

The heating of the probe is done using a heating resistance made in the form of a heating wire wound around the body of the probe, i.e., both in the mast and the Pitot tube.

To produce the heating wire, an electrical conductor is commonly used including an alloy of iron and nickel coated with an insulating material such as alumina or manganese. The insulator itself is coated with a nickel or Inconel sheath allowing brazing of the wire on the body of the probe.

A method for producing such a probe is for example described in patent application FR 2,833,347 filed in the applicant's name.

The production of the heating wire and its assembly in the probe require a series of complex and costly operations.

Another embodiment to heat a Pitot tube probe had been considered in U.S. Pat. No. 4,275,603.

This document describes the use of a heat pipe contributing heat energy around the tube. The return of the heat transfer fluid to liquid state is ensured in a porous material.

This allows the probe to be arranged in any possible orientation on the skin of the aircraft.

In practice, this solution has no industrial advantage due to the difficulty of inserting a porous material in a probe.

The method for producing such a probe is at least as complex as that implementing a heating wire.

The invention seeks to propose a new heated probe, and more generally a piece of aeronautic equipment that is flush or that has a heated outer appendage, the production of which is much simpler than that described in the prior art.

To that end, the invention relates to an aircraft provided with at least two pieces of aeronautic equipment, a first piece of equipment comprising at least one part intended to be arranged at a skin of the aircraft and means for heating the part, characterized in that the heating means comprise a thermodynamic loop comprising a closed circuit in which a heat transfer fluid circulates, the closed circuit comprising an evaporator associated with functional means of the second piece of equipment of the aircraft forming a heat source giving off heat during their operation and a zone in which a condensation of the heat transfer fluid can occur in the appendage to heat it, and in that outside the evaporator, the circuit in which the fluid circulates is formed by a tubular channel with an empty section.

According to other features of the aircraft according to the invention, considered alone or in combination:
the functional means of the second piece of equipment of the aircraft forming a heat source are formed by a part or an electronic board thereof;
the functional means of the second piece of equipment of the aircraft forming a heat source are formed by an actuator thereof;
the functional means of the second piece of equipment of the aircraft forming a heat source are formed by a part or a piece of electrical equipment thereof;
the channel is configured for the fluid to circulate therein by capillarity;
it comprises a circulation pump for the heat transfer fluid;
the tubular channel forms a single thermodynamic loop outside the evaporator;
the tubular channel forms several thermodynamic loops in which the heat transfer fluid circulates in parallel outside the evaporator;
the part is configured to be flush with the skin of the aircraft;
the part is an appendage configured to be arranged protruding relative to the skin of the aircraft;
the first piece of equipment comprises a base intended to fasten the piece of equipment on the skin of the aircraft, the appendage is arranged on a first side of the base and the evaporator is arranged on a second side of the base, opposite the first side;
the first piece of equipment comprises an aerodynamic measuring probe.

According to another aspect, the invention also relates to a method for producing a first piece of aeronautic equipment of an aircraft as previously described, the equipment comprising a body in which the tubular channel with an empty section is produced, the method being characterized in that the body is produced using an additive manufacturing method.

Lastly, the invention also relates to a data file stored on storage means and able to be loaded in the memory of a processing unit associated with an additive manufacturing machine able to manufacture an object by superimposing layers of material, characterized in that it comprises data for three-dimensional depiction of the first piece of equipment for an aircraft as previously described, so as to allow, when it is loaded into memory of, and processed by, said processing unit, the manufacture of said piece of equipment by said additive manufacturing machine.

The invention will be better understood, and other advantages thereof will appear, upon reading the detailed description of one embodiment given as an example, this description being illustrated by the attached drawing, in which:

FIG. 1a diagrammatically shows a thermodynamic loop able to heat a piece of aeronautic equipment;

FIG. 1b diagrammatically shows several thermodynamic loops able to heat a piece of aeronautic equipment;

For clarity reasons, the same elements bear the same references in the different figures.

Figure 1A:
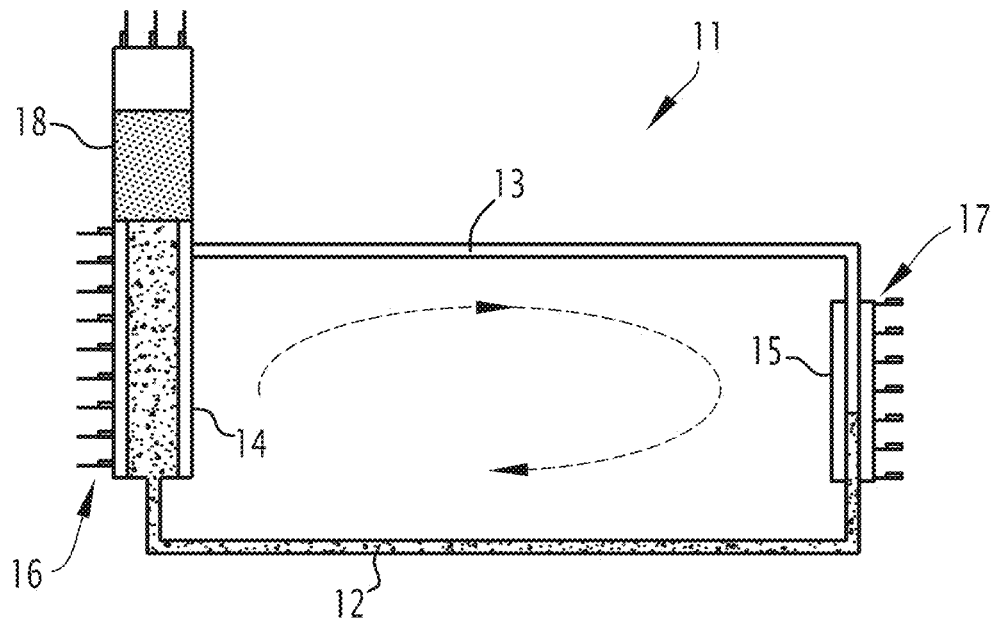

FIG. 1a diagrammatically shows a thermodynamic loop 11 in which a heat transfer fluid circulates in a closed circuit.

In this loop, the fluid may assume two phases: liquid 12 and vapor 13.

The latent transformation heat between these two phases is used to transport heat energy between an evaporator 14 and a condenser 15.

This type of thermodynamic loop is widely used to cool electronic components dissipating heat during their operation.

In general, a heat contribution, diagrammed by arrows 16, at the evaporator 14, is transported by the fluid in vapor phase 13 toward the condenser 15, where the energy contribution is returned to the surrounding environment.

This return is diagrammed by arrows 17.

The closed circuit also comprises a reservoir 18 containing heat transfer fluid in liquid state. The reservoir 18 is arranged near the evaporator 14. The reservoir 18 supplies the loop 11 via the evaporator 14.

Thus, once a sufficient energy contribution is captured by the evaporator 14, the fluid in liquid state contained in the evaporator vaporizes. The overpressure due to the evaporation pushes the fluid in vapor state 13 toward the condenser 15, where the fluid regains its liquid state to return toward the evaporator 14.

In the present application, the thermodynamic loop 11 is used to heat part of a piece of onboard aeronautic equipment.

Onboard an aircraft, many pieces of equipment have protruding appendages relative to the skin of the aircraft or flush parts.

These pieces of equipment may be aerodynamic probes, antennas, sensors, etc.

These appendages or these flush parts require heating to allow them to operate. This heating is particularly important for the aerodynamic probes, which have orifices used as pressure taps.

The heating makes it possible to avoid the formation of ice, which could obstruct these orifices.

The fire probes, which have a vane intended to be oriented in the bed of the airflow surrounding the probe, are also sensitive to the ice that may form on the vane and alter its shape, thus causing an incorrect measurement, or even blocking of the vane.

Figure 1B:
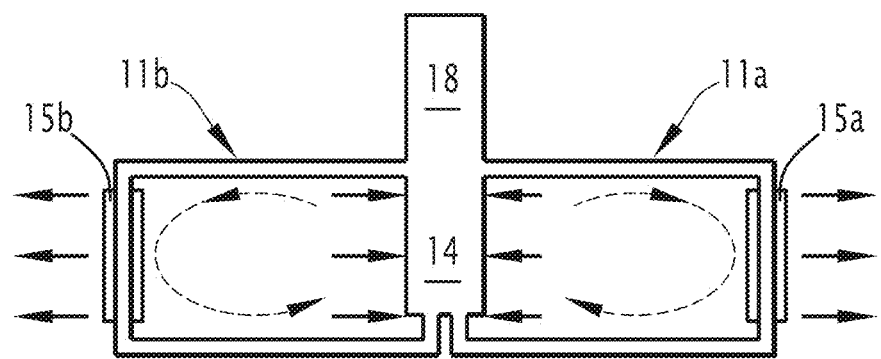

FIG. 1b diagrammatically shows two thermodynamic loops 11a and 11b in which the heat transfer fluid circulates in parallel outside an evaporator 14 shared by the different loops.

These different loops 11a and 11b more specifically make it possible to heat different zones, forming condensers 15a and 15b, of an appendage or part of a piece of aeronautic equipment.

The invention may of course be implemented for more than two thermodynamic loops.

Figure 2:
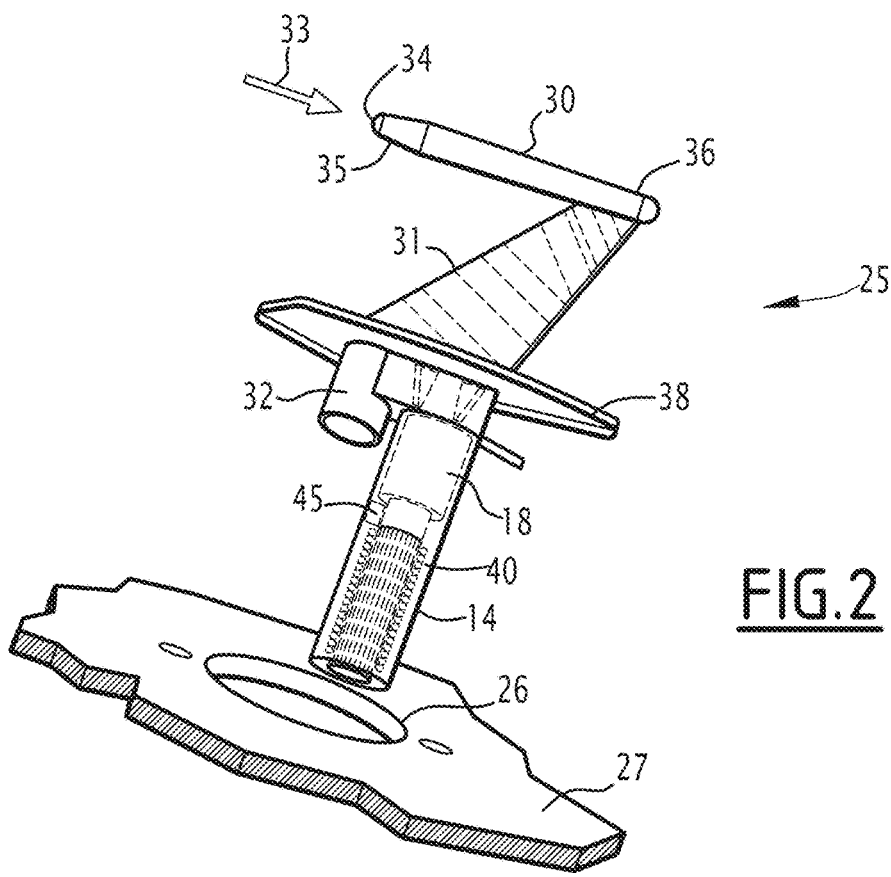
FIG. 2 shows an aerodynamic probe intended to measure the total pressure and equipping an aircraft.

FIG. 2 shows an aeronautic probe 25 making it possible to measure the total pressure of an airflow surrounding the skin 27 of an aircraft.

The probe 25 is intended to be fixed crossing through an opening 26 formed in the skin 27 of the aircraft.

In FIG. 1, the skin 27, at its opening 26, is shown at a distance from the probe 25.

The probe 25 comprises a Pitot tube 30 and a mast 31 supporting the Pitot tube 30.

The Pitot tube 30 and the mast 31 are outside the skin 27.

The probe 25 also comprises a part inside the skin 27 including a pneumatic connector 32 allowing the pneumatic connection of the Pitot tube 30 to a pressure sensor situated inside the fuselage of the aircraft.

The probe 25 is positioned on the skin 27 of the aircraft such that the Pitot tube 30 is oriented substantially along a longitudinal axis of the aircraft, outside the boundary layer, so that the direction of the flow, embodied by an arrow 33, is substantially across from an inlet orifice 34 situated at first end 35 of the Pitot tube 30.

A second end 36 of the Pitot tube 30, opposite the end 35, is closed so as to create a stop point in the air taken from the flow and penetrating the tube 30 through its orifice 34.

At the end 36 of the tube, a pneumatic channel, not shown in FIG. 1, opens in the tube 30 to form a pressure tap therein at which one seeks to measure the air pressure.

The pneumatic channel is for example connected to a pressure sensor or another pressure measuring device, for example a flowmeter.

The pressure sensor allows an effective measurement of the air pressure prevailing inside the tube 30 at its obstructed end 36.

The pressure sensor can belong to the probe 25 or be offset. In this case, the pressure sensor is connected to the probe 25 using a hose and the pneumatic connector 32.

At the end 36, the tube 30 includes one or several drain holes, not shown, allowing the discharge of the water penetrating the inside of the tube 30.

Aside from the bleed hole(s), which have a small section relative to that of the tube 30, the tube 30 is closed at its end 36.

The pressure measured at this end therefore represents the total pressure Pt of the flow of air.

The mast 31 bears the Pitot tube 30 at its second end 36.

The Pitot tube 30 has a substantially cylindrical shape and the mast 31 has an elongated shape. The mast 31 is for example in the shape of a wing, the concave and convex sides of which may be symmetrical.

The probe 25 may comprise other pressure taps, for example pressure taps arranged on the mast 31 or around the tube 30 on its cylindrical part and making it possible to define the local incidence of the flow relative to the probe 25 or measuring the static pressure of the flow.

The probe 25 comprises fastening means intended to fasten the probe 25 to the skin 27 of the aircraft.

These means for example comprise a base 38 formed by a shoulder intended to come into contact with the skin 27.

Screws arranged around the opening 26 immobilize the base 38 relative to the skin 27.

In the illustrated example, the Pitot tube 30 is stationary relative to the skin 27 of the aircraft.

It is of course possible to mount the Pitot tube 30 on a moving mast, for example a vane that may be oriented in the axis of the flow, as for example described in the patent published under no. FR 2,665,539 and filed on Aug. 3, 1990.

The base 38 then comprises a pivot link allowing the rotation of the mast 31 relative to the skin 27 around an axis perpendicular to the skin 27.

Thus, when the local incidence of the flow, near the probe 25, evolves, the orientation of the Pitot tube 30 follows this incidence so as always to face the flow.

The total pressure measurement Pt is thereby improved during local incidence variations of the flow along the skin 27 of the aircraft.

The evaporator 14 and the reservoir 18 are arranged inside the fuselage of the aircraft on one side of the base 38.

The condenser 15 is formed by a channel arranged in the mast 31 and in the Pitot tube 30.

Heating means make it possible to contribute heat energy to the evaporator 14.

These means for example comprise a heating electrical resistance 40 arranged around the evaporator 14.

Any other means making it possible to contribute heat to the evaporator may also be implemented in the context of the invention, for example the passage of a hot air flow along the outer walls of the evaporator 14.

Of course, other means may be considered, as will be described in more detail below.

It is possible to place a temperature sensor in the appendage, making it possible to measure its temperature to enslave the heating means.

Alternatively, a temperature measurement of the fluid in the evaporator 14 provides an image of the temperature of the appendage.

Using a thermodynamic loop to heat the probe 25, and more generally an aeronautic appendage, has the advantage of facilitating the regulation of the temperature of the appendage by controlling the heating means delocalized inside the skin of the aircraft near the appendage.

The fluids generally used as heat transfer fluids in a diphasic thermodynamic loop can have high latent transformation heats, which makes it possible to reduce the fluid flow rate in the loop for a same heat exchange.

The reduction in flow rate makes it possible to reduce the pressure losses in the loop.

As an example, methanol may be used as heat transfer fluid.

In the situation described above, the fluid circulates in a tubular channel 39 with an empty section between the evaporator 14 and the condenser 15, in the condenser 15 itself, and between the condenser 14 and the evaporator 14.

In other words, outside the evaporator 14, the circuit in which the fluid circulates is formed by the tubular channel 39 with an empty section.

A tubular channel with an empty section refers to a channel not including any filling, other than the fluid, of course.

In particular, no porous material is present in the tubular channel 39. The inner walls of the tubular channel 39 are smooth to facilitate the circulation of the fluid and limit the pressure losses.

Figure 3A:
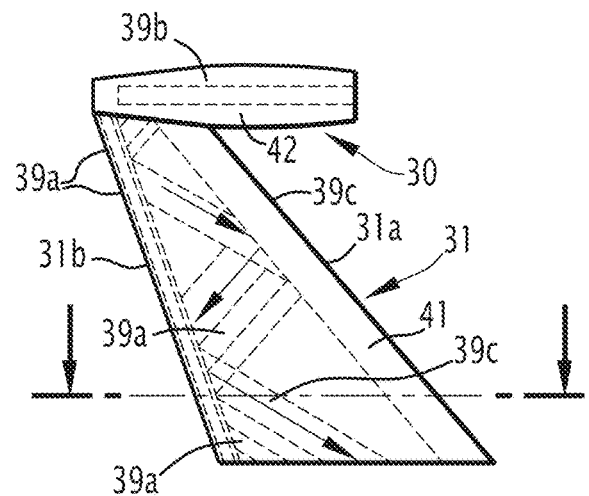
FIGS. 3a and 3b show a mast and a Pitot tube forming outer parts of the probe of FIG. 1.
Figure 3B:
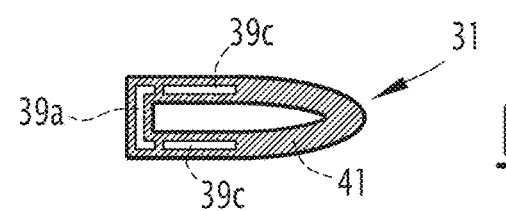

FIGS. 3a and 3b show an example arrangement of the channel 39 equipping the outer parts of the probe 25 and in which the heat transfer fluid circulates that makes it possible to heat these outer parts.

The mast 31 and the tube 30 both comprise an enclosure, 41 for the mast, and 42 for the tube 30.

The pneumatic channel used for the pressure measurement circulates in the enclosure 41. The channel 39 is made in the respective enclosures.

In the channel 39, the fluid that circulates therein is able to condense to heat the corresponding enclosure or part of that enclosure as needed.

More specifically, another advantage related to the production of the tubular channel 39 with an empty section is the auto-adaptation capacity of the heat exchanges at the probe.

Indeed, the exchange coefficient between the fluid and the wall, condensation coefficient, is related to the temperature gradients between the fluid and the wall.

The heat exchanges are greater in the coldest zones of the probe 25. These coldest zones correspond to the zones of the enclosures where the outer cooling is greatest.

This makes it possible to obtain better homogeneity of the probe in terms of temperature.

FIG. 3a shows the mast 31 and the pitot tube 30 in profile. One example path of the channel 39 in the corresponding enclosures can be seen in this figure.

FIG. 3b shows the mast 31 in sectional view in a plane parallel to the skin 27 near the opening 26.

Along its path, the channel 39 can be broken down into three parts 39a, 39b and 39c, following one another.

After it leaves the evaporator 14, the fluid circulates in the part 39a made in the enclosure 41. The part 39a can wind in the enclosure 41 between the leading edge 31a and the trailing edge 31b of the mast 31.

Next, the part 39b of the channel 39 winds in the enclosure 42. The path of the part 39b is for example helical around the inner cavity of the Pitot tube 30 at the bottom of which the total pressure is measured.

The channel 39 continues its path in the part 39c while again circulating in the enclosure 41 of the mast 31.

As for the part 39a, the part 39c can wind in the enclosure 41 between the leading edge 31a and the trailing edge 31b of the mast 31.

The definition of the path of the channel 39 is done based on the zones of the probe that should preferably be heated.

In the illustrated example, the channel 39 winds in the appendage while forming a single loop outside the evaporator 14.

It is also possible to produce several thermodynamic loops in the appendage, in which loops the heat transfer fluid circulates in parallel outside the evaporator 14, as shown diagrammatically in FIG. 1b.

The auto-adaptation of the heat exchange to the actual temperature of the outer walls of the probe 25 allows a more tolerant definition of the path than for a probe heated directly by an electrical resistance.

The section of the channel may vary along its entire path in the mast 31 and in the Pitot tube 30.

The circulation of the fluid in the channel 39 may be ensured using a circulation pump 45 arranged upstream from the evaporator 14. The circulation pump 45 is advantageously arranged inside the skin 27 of the aircraft.

Alternatively, it is possible to do away with this circulation pump 45 by configuring the section of the different parts 39a to 39c of the channel 39 so that the fluid circulates in its liquid phase by capillarity.

Such a circulation mode requires relatively small sections.

In order to retain a sufficient overall flow rate, the channel 39 may comprise zones placed in parallel.

It is advantageous to produce the probe 25, and more generally any piece of aeronautic equipment implementing the invention, by carrying out an additive manufacturing method to manufacture the mechanical part(s) in which the channel 39 travels.

This method is also known as 3D printing.

At this time, it is known to produce metal parts using this method. It is for example possible to use titanium-based alloys, aluminum-based alloys, or more generally, stainless steel alloys with a base of steel, nickel and/or chromium.

Figure 4:
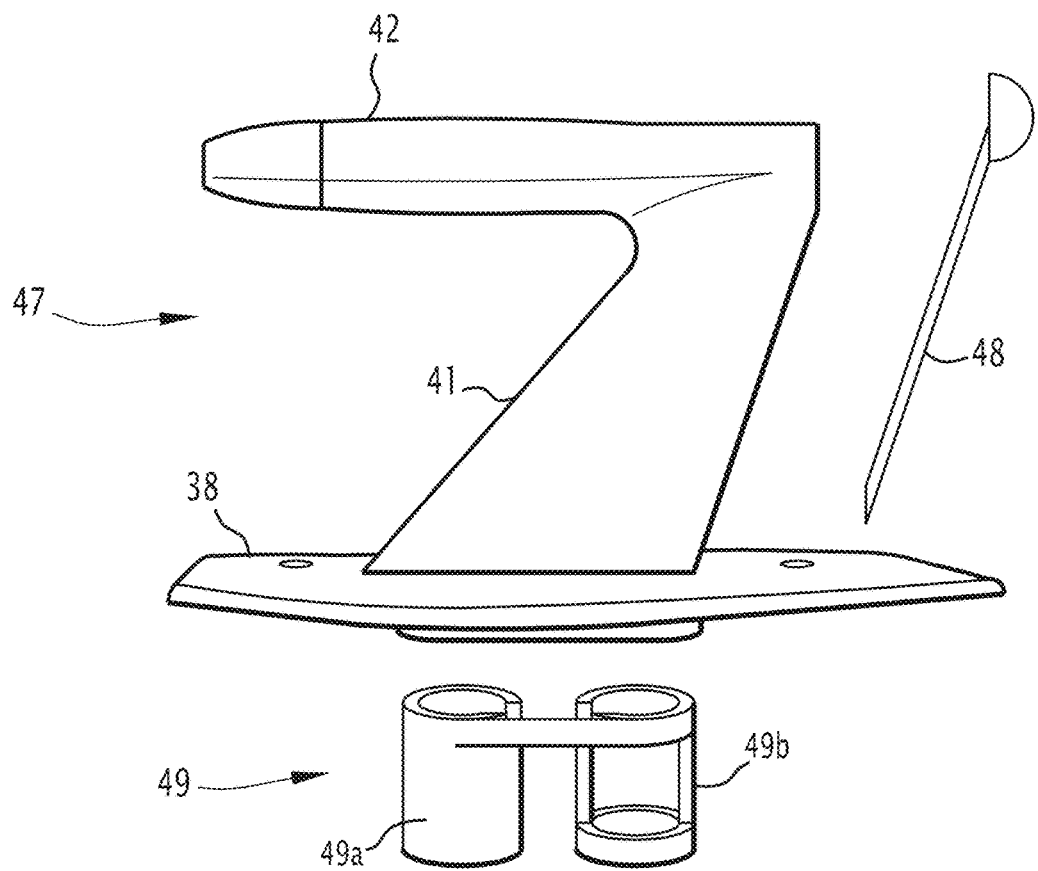
FIG. 4 shows an exploded view of different component parts of the probe.

FIG. 4 shows an exploded view of several mechanical parts which, when assembled, form the probe 25.

A body 47 forms the base 38 and the enclosures 41 and 42. The channel 39 can be made directly in the body 47 by additive manufacturing.

The body 47 can remain open at its trailing edge, for example to arrange, in the body, the pneumatic channels making it possible to measure the total pressure.

Alternatively, these channels may also be made using the additive manufacturing method.

The trailing edge 31a of the mast 31 and the end 36 of the Pitot tube can be closed using a stopper 48 that can be made using any type of manufacturing method.

The shapes of the stopper 48 are simpler than those of the body 47. It is for example possible to produce the stopper 48 by molding.

The additive manufacturing can of course also be used for the stopper 48.

A support 49 can complete the probe 25.

The support 49 can be used to support the pneumatic connector in a first part 49a as well as the evaporator 14 in a second part 49b.

The support is assembled to the body 47 by the base 38.

Figure 5A:
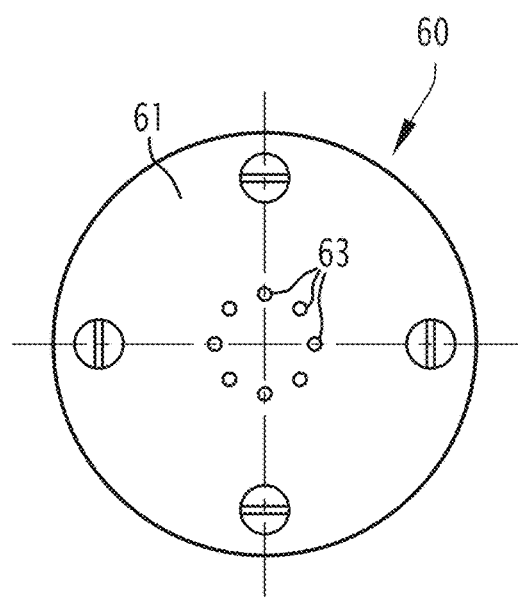
FIGS. 5a and 5b show an aerodynamic probe intended to measure the static pressure and equipping an aircraft.
Figure 5B:
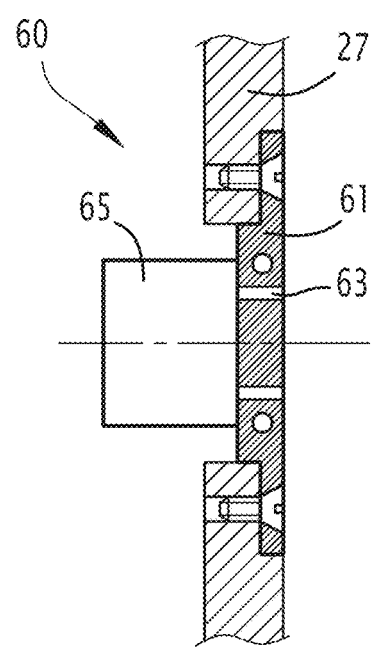

FIGS. 5a and 5b show another aerodynamic probe 60.

More specifically, the probe 60 forms a piece of aeronautic equipment comprising a part 61 intended to be flush with the skin 27 of the aircraft.

FIG. 5a is a view in the plane of the skin 27 near the probe 60.

FIG. 5b is a sectional view perpendicular to the plane of the skin 27.

The part 61 is for example in the shape of a disc closing off an orifice 62 of the skin 27. The orifice 62 is provided to receive the part 61 that is fastened by screwing on the skin 27.

The probe 60 is for example a static pressure probe having one or more pressure taps 63 formed from channels emerging substantially perpendicular to the skin 27.

The channel 39 circulates in the part 61. The channel winds around pressure taps 63 in order to heat the part 61 and prevent the pressure taps from being closed off [by] ice.

In this embodiment, the channel 39 can also form a single loop or several parallel loops outside the evaporator 14.

The probe 60 also comprises a part 65 inside the skin 27. The inner part 65 makes it possible to receive a pressure sensor connected to the pressure taps in order to measure the static pressure of the air flowing along the skin 27. The inner part 65 can also accommodate the evaporator 14 and the reservoir 18.

Like for the probe 25, the part 61 is advantageously made by carrying out an additive manufacturing method.

The invention also relates to a data file stored on storage means and able to be loaded in the memory of a processing unit associated with an additive manufacturing machine able to manufacture an object by superimposing layers of material, which comprises three-dimensional depiction data of the piece of equipment as previously described, so as to allow, when it is loaded in the memory of, and processed by, said processing unit, the manufacture of said piece of equipment by said additive manufacturing machine.

Figure 6:
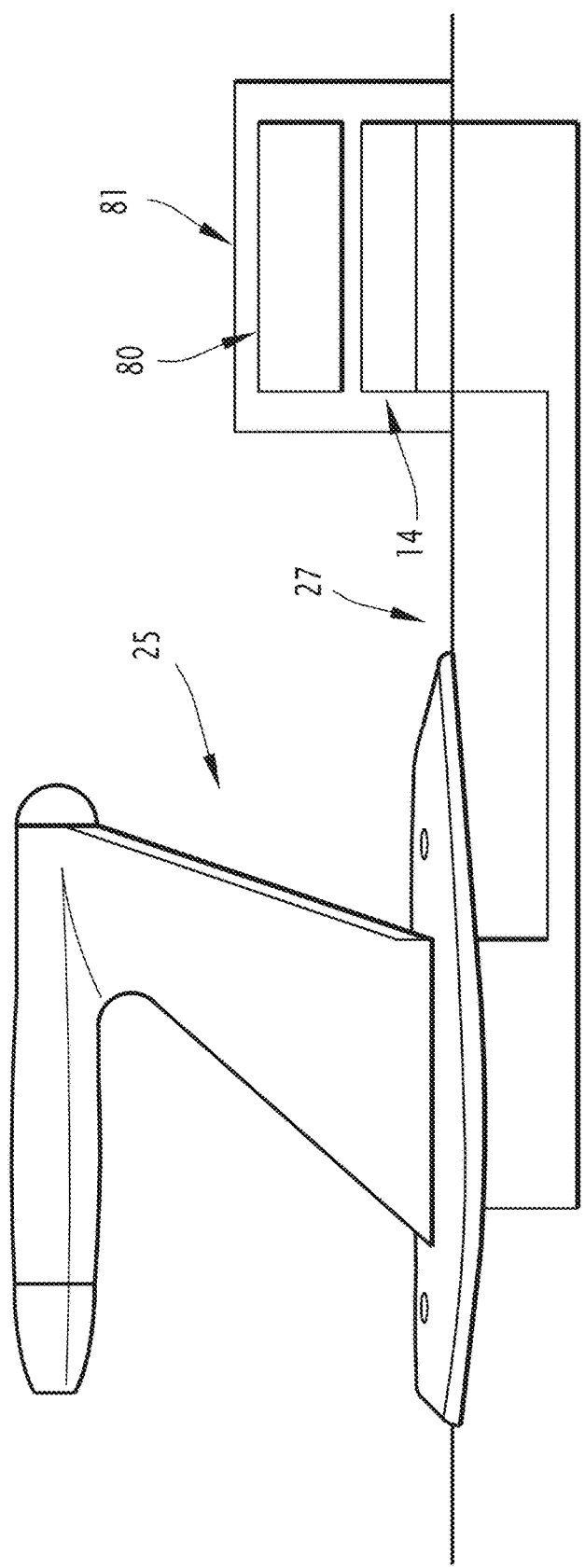
FIG. 6 shows an example embodiment of an aerodynamic probe included in the makeup of an aircraft according to the invention.

FIG. 6 shows a probe 25 fastened to the skin 27 of an aircraft.

In this example embodiment, the evaporator 14 of the heating means is associated with functional means 80 of a second functional piece of equipment 81 of the aircraft forming a heat source for example giving off heat through loss of the heat during their operation.

Thus for example, the functional means of the second functional piece of equipment 81 of the aircraft can be formed by a part of or an electronic board thereof making it possible to contribute heat energy to the evaporator, as illustrated in this FIG. 6.

Of course, still other embodiments may be considered, and these means may be formed by an actuator of the second functional piece of equipment 81 of the aircraft or a part of or a piece of electrical equipment thereof.

Still other embodiments may be considered.

The invention claimed is:

1. An aircraft provided with at least two pieces of aeronautic equipment, a first piece of equipment comprising a part intended to be arranged at a skin of the aircraft and means for heating the part, characterized in that the heating means comprise a thermodynamic loop comprising a closed circuit in which a heat transfer fluid circulates, the closed circuit comprising an evaporator associated with functional means of the second piece of equipment of the aircraft forming a heat source giving off heat during their operation and a zone in which a condensation of the heat transfer fluid can occur in the appendage to heat it, and in that outside the evaporator, the circuit in which the fluid circulates is formed by a tubular channel with an empty section.

2. The aircraft according to claim 1, characterized in that the functional means of the second piece of equipment of the aircraft forming a heat source are formed by a part or an electronic board thereof.

3. The aircraft according to claim 1, characterized in that the functional means of the second piece of equipment of the aircraft forming a heat source are formed by an actuator thereof.

4. The aircraft according to claim 1, characterized in that the functional means of the second piece of equipment of the aircraft forming a heat source are formed by a part or a piece of electrical equipment thereof.

5. The aircraft according to claim 1, characterized in that the channel is configured for the fluid to circulate therein by capillarity.

6. The aircraft according to claim 5, characterized in that it comprises a circulation pump for the heat transfer fluid.

7. The aircraft according to claim 1, characterized in that the tubular channel forms a single thermodynamic loop outside the evaporator.

8. The aircraft according to claim 1, characterized in that the tubular channel forms several thermodynamic loops in which the heat transfer fluid circulates in parallel outside the evaporator.

9. The aircraft according to claim 1, characterized in that the part is configured to be flush with the skin of the aircraft.

10. The aircraft according to claim 1, characterized in that the part is an appendage configured to be arranged protruding relative to the skin of the aircraft.

11. The aircraft according to claim 10, characterized in that the first piece of equipment comprises a base intended to fasten the piece of equipment on the skin of the aircraft, in that the appendage is arranged on a first side of the base and in that the evaporator is arranged on a second side of the base, opposite the first side.

12. The aircraft according to claim 1, characterized in that the first piece of equipment comprises an aerodynamic measuring probe.

13. A method for producing a first piece of aeronautic equipment for an aircraft according to claim 1, the equipment comprising a body in which the tubular channel with an empty section is produced, the method being characterized in that the body is produced using an additive manufacturing method.

14. A data file stored on storage means and able to be loaded in the memory of a processing unit associated with an additive manufacturing machine able to manufacture an object by superimposing layers of material, characterized in that it comprises data for three-dimensional depiction of the piece of equipment for an aircraft according to claim 1, so as to allow, when it is loaded into memory of, and processed by, said processing unit, the manufacture of said piece of equipment by said additive manufacturing machine.

\* \* \* \* \*